A. B. EARLE.
Seed-Planter.
No. 5,858. Patented Oct. 17, 1848.
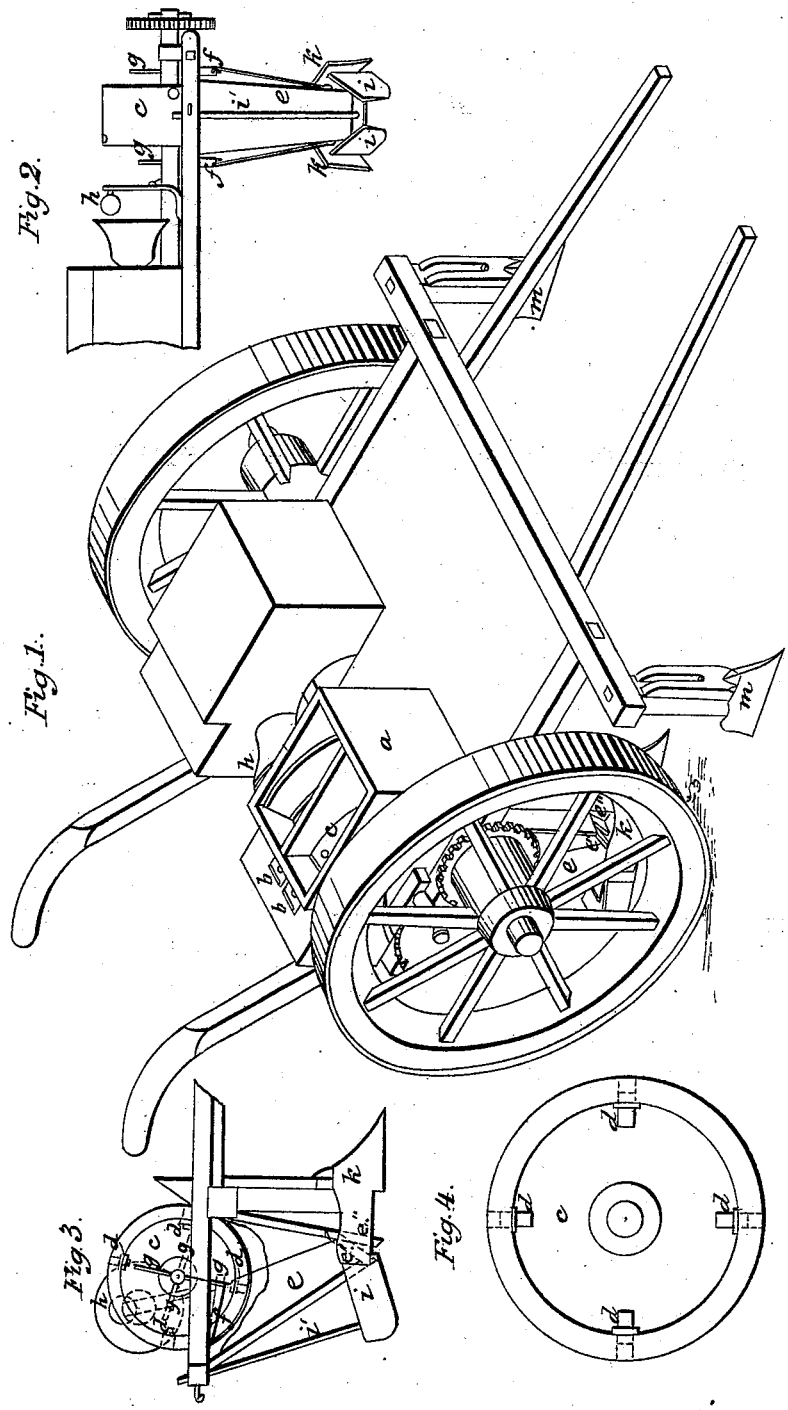

UNITED STATES PATENT OFFICE.

A. B. EARLE, OF COLESVILLE, NEW YORK.

IMPROVEMENT IN PLANTING-PLOWS.

Specification forming part of Letters Patent No. 5,858, dated October 17, 1848.

*To all whom it may concern:*

Be it known that I, ABSALOM B. EARLE, of Colesville, in the county of Broome and State of New York, have invented a new and Improved Cultivator or Seed-Planting Plow; and I do hereby declare the following to be a full, clear, and exact description of the same, reference being had to the annexed drawings, making a part of this specification, in which—

Figure 1 is a perspective view. Fig. 2 is an end elevation from the back, with the seed-box removed. Fig. 3 is a longitudinal elevation of the seed-drum, a part being in section and seed-box removed. Fig. 4 is a side view of the seed-drum.

Similar letters refer to similar parts throughout.

The nature of my invention consists in the construction of an instrument which I denominate a "planting-plow," because it performs the office of plowing and planting at the same time and in one machine.

The general appearance of my invention is that of a light broad-wheeled cart, on the floor of which I place the seed-drums, bags of seed, manure, &c., and to certain other parts I attach various plows, or, rather, the various descriptions of the mold-boards of plows, in the manner hereinafter described.

In Fig. 1 a perspective view of the entire machine is seen.

The letter *a* represents the seed-box, and is a case open at the top and bottom, with a partition dividing it in two parts longitudinally. The box incloses the seed-drum, and the partition is rounded on the under side, so as to rest upon the periphery of the drum. At the back part of the box, which is cut down a little lower, two narrow openings are made, through which two scrapers, *b b*, are put for the purpose of leveling the seeds which are taken up in the seed-cups seen in the periphery of the drum.

*c* is the seed-drum, and is a cylinder of wood or other suitable material suspended upon a shaft, and upon which it revolves. The periphery is pierced with a series of holes for the purpose of receiving the seeds and conveying them to the delivering-spouts. I have adapted a regulating-stop to these so as to increase or diminish their capacity at pleasure or close them entirely up. This consists of a plug, *d*, inserted in the interior face of the drums, and forms the bottom of the seed-cups. If I want to reduce the number of seed-cups, I shove the plugs up flush with the top of the drum and draw them in to regulate the depth of the cup as required. There are two rows of seed-cups around the drum, so as to take seeds from each side of the partition in the box *a*. The drum is placed upon the cart so that its shaft shall lie parallel to the axle-tree of the same, and is made to revolve by means of cog-gearing upon it and the hubs of the wheels.

Beneath the seed-drum and under the cart there is a delivering-spout, *e*, which receives the seeds taken from the box *a* and drops them in the drill. The spout is divided by a partition to correspond with the partition in the box *a*. At the bottom of the spout there are two clapper-valves, *e′ e″*, which close the spout on each side of the partition. These valves are kept shut by springs, *f*, placed in convenient positions under the framing of the cart, and are made to open alternately by means of pins *g*, stuck in the shaft of the seed-drum, so that they are opened and closed at each delivery of seed from the drum to the spout. The opening of valves also operates the clapper *h* of a bell, which is a signal of the time of each delivery of seed into the ground. A double-mold-board plow goes a little in advance of the delivering-spout in order to open the drill for the seed. It has means of regulation, so as to open the ground to the proper depth. The back part is made narrower than the front by cutting away a part of its lower edge, and also is made to flare or spread apart considerably, the object of which is to throw off the lumps and equalize the surface of ground upon the drill.

Immediately behind the spout there are two angular boards, *i i*, affixed for the purpose of closing the ground over the seeds after they have been delivered from the spout. The closers are hinged at their front ends. The back edges can be raised or lowered by the rod *i′*, so as to regulate the amount of soil to be thrown upon the seeds.

A beam extends across the front of the cart, from the ends of which depend two posts, having a double-mold-board plow, *m*, attached to each. These plows are so fixed as to advance immediately in front of the wheels of the cart and open the ground so as to form a level track for them to run in. At the back of the cart there are two handles, similar to plow-handles, so as to lift the tail of the cart and set it in the position wanted. The cart itself is built of any suitable materials and of convenient shape.

In operation the horse is harnessed in the shaves and the machine brought up square with the border of the field to be planted and adjusted by the handles behind. Seed is now put into the box, and by means of the partition two kinds may be planted at once—as, for instance, Indian corn on one side and pumpkin-seed on the other. Bags of each are also put on the floor of the cart to supply the box $a$ as fast as wanted. One wheel of the cart is now lifted up by the handle at the back and turned round by hand until the seed-drum deposits a cup of seed into the spout and that into the ground, a stroke of the bell announcing the exact time. The sower then jumps upon the cart and drives across the field to the opposite fence or border, the bell striking at each deposit of seed. If there are two kinds—as corn and pumpkins—one hill is planted in corn and the next in pumpkins, as in the usual way, and the valves in the spouts open and close alternately to effect that object. The plow $k$, advancing before the spouts, opens the furrow to the required depth, the point going deeper in the ground than its sides. The sides flare off at the top to throw back the lumps and otherwise level the ground on each side of the furrows. The closers $i$ cover the seed to the exact depth required. The plows $m$ prepare a track for the wheels to run in, so as to insure their being always level. When the cart has crossed the sower jumps off and raises the wheel to which the gearing is attached for driving the seed-drums while the horse is turning about. Then, as before, he adjusts it at the required width of the furrow and turns the wheel until the bell has signaled the deposit of seed at the precise place. The cart is then started off as before. A boy may be used to drive and feed the seeds, while the sower follows on behind.

In the above description I have fully set forth the whole construction of a planting-plow, both as to parts well known and those which I consider as of my own invention and arrangement. The principal feature of novelty, however, in this machine I would have understood to be in that part which relates to signaling the time each deposit of the seed is made, for by this arrangement the utmost certainty is obtained, as the sounds on the bell or other contrivance for making the sounds at once proves the deposit of seed at that place, for the signal is produced only when the valves $e'\ e''$ open and they deliver the seed. Any obstruction to the working of these valves is at once ascertained by the cessation of sounds on the bell, and the plow can be immediately stopped until the defect is remedied, thus insuring the full and regular planting of every field gone over by the machine.

In the above-described seed-planter I do not claim the seed-drums, plows, or means of operating the same, as these are all well-known devices; but

What I claim as my invention and improvement, and desire to secure by Letters Patent, is—

The combination of the signal-bell or other like indicator with the valves $e'\ e''$ to announce the exact time of depositing the seeds, substantially as described and set forth herein.

A. B. EARLE.

Witnesses:
J. L. KINGSLEY,
WILLIAM BECK.